United States Patent [19]

Umeha et al.

[11] Patent Number: 4,665,766
[45] Date of Patent: May 19, 1987

[54] SHAFT MEMBER

[75] Inventors: Genkichi Umeha, Suginami; Osamu Hirakawa, Yono, both of Japan

[73] Assignee: Nippon Piston Ring Co., Ltd., Japan

[21] Appl. No.: 740,846

[22] PCT Filed: Mar. 23, 1984

[86] PCT No.: PCT/JP84/00128
§ 371 Date: May 17, 1985
§ 102(e) Date: May 17, 1985

[87] PCT Pub. No.: WO85/01554
PCT Pub. Date: Apr. 11, 1985

[30] Foreign Application Priority Data

Sep. 28, 1983 [JP] Japan .............. 58-150068[U]

[51] Int. Cl.⁴ ............................................. F16H 53/00
[52] U.S. Cl. ...................... 74/567; 474/903; 74/439
[58] Field of Search ............... 74/567, 15, 447, 434, 74/439; 123/90.6, 90.31; 474/903

[56] References Cited

U.S. PATENT DOCUMENTS 2,729,399  1/1956  Stammwitz ............... 74/567 X
3,447,395  6/1969  Latour ..................... 74/567

Primary Examiner—Henry A. Bennett
Attorney, Agent, or Firm—Birch, Stewart, Kolasch & Birch

[57] ABSTRACT

A shaft-end constituent member (14) of a material which is different from that of a shaft (12) is firmly attached to one end of the shaft (12). The shaft-end constituent member (14) is provided with an axial projection (15) corresponding to a recess (13) formed in the outer peripheral surface of the shaft (12), and a joint bore (16) is formed in the projection (15) to receive a joint member (17). The joint member (17) enables the retention of a component (20) such as a pulley or the like, so that the component (20) does not rotate about the shaft (12).

4 Claims, 5 Drawing Figures

SHAFT MEMBER

TECHNICAL FIELD

The invention relates to a shaft member for use with a camshaft used for actuation of suction and exhaust valves in an internal combustion engine, the shaft member having a shaft-end constituent member separately fabricated from the shaft, the shaft-end constituent member being formed with a joint bore for fitting engagement with a joint pin.

BACKGROUND ART

A composite camshaft has a shaft and separately fabricated constituent members, such as gears, cams, sprockets and journals fixedly mounted on the shaft. The shaft-end constituent member and the shaft is joined with each other with the intervention of a joint pin located in the boundary between the shaft and the constituent member. For example, the camshaft disclosed by Pat. No. U 58-37901 has the sprocket wheel fixed to the shaft by a pin passing through a bore in the boundary between the shaft and the sprocket wheel. However, the constituent member and the shaft generally differ in material so that the boundary portion is not easily drilled. Therefore, the drilled bore is not accurate but sometimes eccentric or disorderly in dimension. The problem becomes more serious when the composite camshaft has a steel shaft and cam lobes and journals made of a sintered alloy material. The reason for this is that the sintered alloy elements, such as chromium and copper, diffuse toward the shaft to form a hard cementation layer and make the boundary too hard to be machined.

The present invention is intended to resolve the problem as described above and provide a shaft member in which the fitting portions between the camshaft and the shaft-end constituent member are so formed that no joint bore is drilled in the boundary therebetween.

DISCLOSURE OF THE INVENTION

To attain the aforementioned object, the present invention consists of a shaft member composed of a shaft and a shaft-end constituent member fixedly mounted on the shaft, the constituent member being made of a material different from the shaft and provided with a joint bore. The shaft member is characterized in that a pair of axial recess and projection are respectively formed on the outer surface of one end of the shaft and on the inner surface of the bore in the constituent member for coupling the elements to each other.

The joint bore is not provided in the boundary between the shaft and the constituent member but in the axial projection to be in mesh with the axial recess in the shaft-end. The shaft member in accordance with the present invention has the advantage that the joint bore is accurate and free from becoming eccentric or disorderly in dimension.

BRIEF DESCRIPTION OF DRAWINGS

FIG. 1 being a front section; FIG. 2 being a section taken along line II—II of FIG. 1; and FIG. 3 being a perspective view of the shaft; FIG. 4 being a front section; and FIG. 5 being a perspective view of the shaft.

BEST MODE OF CARRYING OUT THE INVENTION

The shaft member of the present invention will be described in detail below with reference to drawings.

Figure 1:
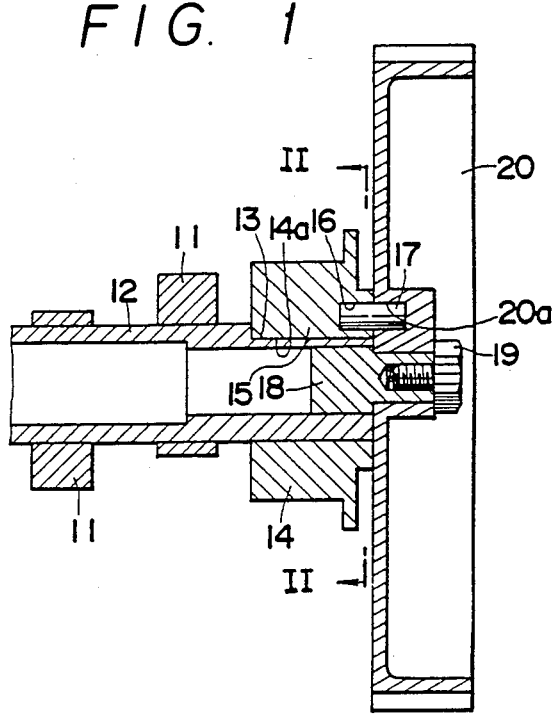
FIGS. 1 to 3 illustrate one embodiment of the invention.
Figure 2:
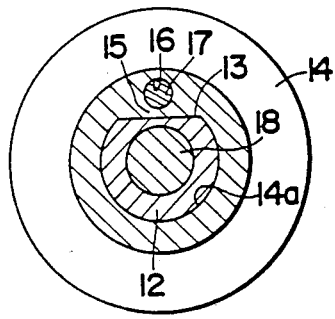
Figure 3:
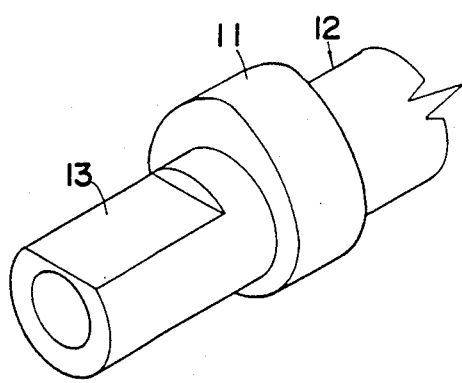

Referring now to FIGS. 1 to 3, a plurality of cams 11 are fixedly mounted on the middle portion of a steel shaft 12 of which the shaft end bears a journal 14 made of a sintered material as a shaft-end constituent member. The shaft end has its outer surface formed with an axial flat recess 13. On the other hand, the journal 14 has the inner surface formed on its bore 14a with an axial flat projection 15 for fitting engagement with the axial recess 13. The projection 15 has an outer end suface formed with a joint bore 16 by drilling. A joint pin 17 has one half thereof inserted into the bore 16 and the other half situated in a detent bore 20a in a pulley 20. The pulley 20 is mounted on a plug 18 secured to the shaft end of the shaft 12. The pulley is prevented from rotation relative to the shaft 12 by the joint pin 17 and fastened to the journal 14 by a bolt 19 which is screwed into the plug 18.

Figure 4:
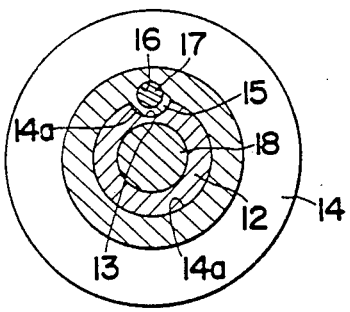
FIGS. 4 and 5 illustrating another embodiment of the invention.
Figure 5:
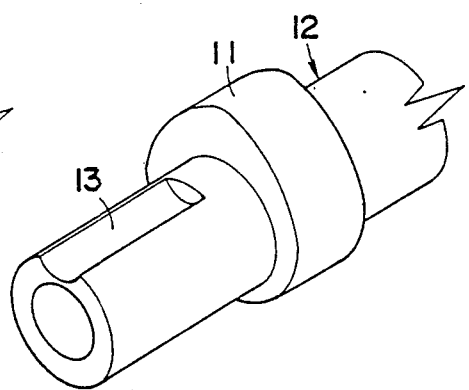

Referring to FIGS. 4 and 5 in which another embodiment is shown, the same members as in the previous embodiment are indicated by the same reference numerals. The shaft end of the camshaft 12 has the outer surface formed with an axial arcuate recess 13 for fitting engagement with an axial arcuate projection 15 which is formed in the inner surface of the bore 14a of the journal 14.

We claim:

1. A shaft member attached at one end thereof to a pulley for use in an internal combustion engine comprising a shaft (12) having a hollow end portion, a shaft-end journal member (14) made of a different material from said shaft and fitted on and fixed to one end of said shaft, said shaft-end journal member having the outer side end thereof formed with a joint bore (16), an axial recess (13) provided at one end of the outer surface of said shaft (12), an axial projection (15) formed on the inner surface of said shaft-end journal member and engaged with said axial recess, said joint bore (16) being formed in said axial projection, a detent bore provided in said pulley opposite said joint bore and a joint pin disposed in said joint bore and said detent bore whereby the journal member and in turn the shaft member are attached to said pulley, a plug inserted in the hollow end portion of the shaft member and extending into said pulley and a bolt is inserted into said plug to secure the plug and in turn the shaft member to said pulley.

2. The shaft member of claim 1, wherein said journal member (14) is made of a sintered material.

3. The shaft member of claim 1 wherein the axial recess is a flat recess.

4. The shaft member of claim 1 wherein the axial recess is an accurate recess.

* * * * *